US012238660B2

(12) United States Patent
Moon et al.

(10) Patent No.: US 12,238,660 B2
(45) Date of Patent: Feb. 25, 2025

(54) BEAM MANAGEMENT METHOD USING HIERARCHICAL BEAMS, AND APPARATUS THEREFOR

(71) Applicant: ELECTRONICS AND TELECOMMUNICATIONS RESEARCH INSTITUTE, Daejeon (KR)

(72) Inventors: Sung Hyun Moon, Daejeon (KR); Young-Jo Ko, Daejeon (KR); Cheul Soon Kim, Daejeon (KR); Jung Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 394 days.

(21) Appl. No.: 17/890,351

(22) Filed: Aug. 18, 2022

(65) Prior Publication Data
US 2023/0064052 A1 Mar. 2, 2023

(30) Foreign Application Priority Data

Aug. 19, 2021 (KR) .......................... 10-2021-0109721
Aug. 3, 2022 (KR) .......................... 10-2022-0096599

(51) Int. Cl.
*H04J 3/06* (2006.01)
*H04B 17/318* (2015.01)
(Continued)

(52) U.S. Cl.
CPC ........ *H04W 56/001* (2013.01); *H04B 17/318* (2015.01); *H04W 74/0833* (2013.01)

(58) Field of Classification Search
CPC ............ H04W 56/001; H04W 74/0833; H04B 17/318; H04B 7/0695; H04B 7/088
See application file for complete search history.

(56) References Cited

U.S. PATENT DOCUMENTS

2020/0221428 A1* 7/2020 Moon ................... H04L 1/0046
2020/0288359 A1 9/2020 Kim
(Continued)

FOREIGN PATENT DOCUMENTS

CN 115915304 A * 4/2023 ............ H04W 36/00
CN 117999743 A * 5/2024 ............. H04B 7/088
(Continued)

*Primary Examiner* — Thai Dinh Hoang
(74) *Attorney, Agent, or Firm* — LRK PATENT LAW FIRM

(57) ABSTRACT

A method of a terminal may include: receiving, from a base station, at least one SSB belonging to a first layer; receiving, from the base station, at least one SSB belonging to a second layer; determining valid SSB(s) from among the at least one SSB belonging to the first layer and the at least one SSB belonging to the second layer; selecting at least one first SSB belonging to a layer having a higher priority among the first layer and the second layer from among the valid SSB(s); and reporting the selected first SSB to the base station, and using a beam used for receiving the first SSB to perform an initial access procedure for communications with the base station, wherein each SSB includes at least one of a synchronization signal or a broadcast channel.

20 Claims, 11 Drawing Sheets

(51) Int. Cl.
      *H04W 56/00*      (2009.01)
      *H04W 74/0833*      (2024.01)

(56) References Cited

U.S. PATENT DOCUMENTS

| | | |
|---|---|---|
| 2020/0314673 A1 | 10/2020 | Deogun et al. |
| 2021/0083916 A1 | 3/2021 | Si et al. |
| 2021/0226689 A1 | 7/2021 | Farag et al. |
| 2021/0274466 A1 | 9/2021 | Murray et al. |
| 2022/0104153 A1 | 3/2022 | Ko et al. |
| 2022/0232463 A1 * | 7/2022 | Sadique ................ H04W 48/18 |

FOREIGN PATENT DOCUMENTS

| | | | | |
|---|---|---|---|---|
| KR | 20220066955 A | * | 5/2024 | ............. H04W 4/40 |
| WO | 2020/226265 A1 | | 11/2020 | |
| WO | WO-2022246339 A2 | * | 11/2022 | ............. H04B 7/088 |
| WO | WO-2024077154 A1 | * | 4/2024 | ........... H04L 5/0053 |
| WO | WO-2024097295 A1 | * | 5/2024 | ............. H04L 5/001 |

\* cited by examiner

BEAM MANAGEMENT METHOD USING HIERARCHICAL BEAMS, AND APPARATUS THEREFOR

CROSS-REFERENCE TO RELATED APPLICATIONS

This application claims priority to Korean Patent Applications No. 10-2021-0109721 filed on Aug. 19, 2021, and No. 10-2022-0096599 filed on Aug. 3, 2022 with the Korean Intellectual Property Office (KIPO), the entire contents of which are hereby incorporated by reference.

BACKGROUND

1. Technical Field

The present disclosure relates to a beam management method in an ultra-high frequency band communication system, and more particularly, to a beam management method utilizing hierarchical beams in an ultra-high frequency band communication system, and apparatus therefor.

2. Description of Related Art

Communication systems are continuously evolving to expand communication infrastructure for the realization of a hyper-connected society. For example, a new radio (NR) communication system can support a frequency band of up to 100 GHz as well as a frequency band of 6 GHz or below. In addition, as compared to the conventional communication system (e.g., long-term evolution (LTE) communication system), the NR communication system can support more diverse services and scenarios. For example, usage scenarios of the NR communication system may include enhanced Mobile BroadBand (eMBB), Ultra-Reliable Low-Latency communication (URLLC), massive Machine Type Communication (mMTC), and the like. In addition, the sixth generation (6G) communication system, which is being discussed recently, is expected to enable more diverse services and user experiences by utilizing a terahertz (THz) frequency band, artificial intelligence, satellite communication, quantum technologies, and the like. There are various requirements in the industry that such the communication system must satisfy, and high-level communication technologies are required to achieve the requirements.

SUMMARY

Accordingly, exemplary embodiments of the present disclosure are directed to providing a method for managing beams of a terminal, which utilizes hierarchical beams in an ultra-high frequency band communication system.

Also, exemplary embodiments of the present disclosure are directed to providing a configuration of a terminal performing the above-described method and a configuration of a base station supporting the terminal performing the above-described method.

According to a first exemplary embodiment of the present disclosure, a method performed by a terminal may comprise: receiving, from a base station, at least one synchronization signal block (SSB) belonging to a first layer; receiving, from the base station, at least one SSB belonging to a second layer; determining valid SSB(s) from among the at least one SSB belonging to the first layer and the at least one SSB belonging to the second layer; selecting at least one first SSB belonging to a layer having a higher priority among the first layer and the second layer from among the valid SSB(s); and reporting the selected first SSB to the base station, and using a beam used for receiving the first SSB to perform an initial access procedure for communications with the base station, wherein each SSB includes at least one of a synchronization signal or a broadcast channel.

The valid SSB(s) may be SSB(s) received at the terminal with a received signal strength greater than or equal to a predetermined threshold.

A priority between the first layer and the second layer may be determined by configuration information received from the base station.

A priority between the first layer and the second layer is determined based on a number of SSB(s) belonging to the first layer and/or a number of SSB(s) belonging to the second layer.

The first SSB may be an SSB having a largest received signal strength among the valid SSBs.

The terminal may report the selected first SSB to the base station by transmitting a random access preamble to the base station in uplink resource(s) associated with the selected first SSB.

The performing of the initial access procedure may comprise: at least one of an operation of receiving a downlink signal for initial access based on the beam or an operation of transmitting an uplink signal for initial access based on the beam.

According to a second exemplary embodiment of the present disclosure, a method performed by a terminal may comprise: receiving, from a base station, at least one synchronization signal block (SSB) belonging to a first layer; receiving, from the base station, at least one SSB belonging to a second layer; determining valid SSB(s) from among the at least one SSB belonging to the first layer and the at least one SSB belonging to the second layer; selecting a first SSB belonging to the first layer and a second SSB belonging to the second layer from among the valid SSB(s); and reporting the selected first SSB and the selected second SSB to the base station, and using at least one beam among a first beam used for receiving the first SSB and a second beam used for receiving the second SSB to perform an initial access procedure for communications with the base station, wherein each SSB includes at least one of a synchronization signal or a broadcast channel.

The valid SSB(s) may be SSB(s) received at the terminal with a received signal strength greater than or equal to a predetermined threshold.

The first SSB may be an SSB having a largest received signal strength among valid SSB(s) belonging to the first layer, and the second SSB may be an SSB having a largest received signal strength among valid SSB(s) belonging to the second layer.

The terminal may report the selected first SSB to the base station by transmitting a random access preamble to the base station in uplink resource(s) associated with the selected first SSB, and may report the selected second SSB to the base station by transmitting a random access preamble to the base station in uplink resource(s) associated with the selected second SSB.

The at least one beam used to perform the initial access procedure among the first beam and the second beam may be determined based on a rule predefined in a technical specification or configuration information received from the base station.

One of the first beam and the second beam may be selected as a primary beam used for control channel transmission to the base station, the other beam may be selected as a secondary beam used for data channel transmission to the base station, and a beamwidth of the primary beam may be wider than a beamwidth of the secondary beam.

According to a third exemplary embodiment of the present disclosure, a method performed by a base station may comprise: transmitting at least one synchronization signal block (SSB) belonging to a first layer; transmitting at least one SSB belonging to a second layer; and receiving a report of a first SSB selected by the terminal from the terminal, and using a beam used for transmitting the first SSB to perform an initial access procedure for communications with the terminal, wherein the first SSB is one of valid SSB(s) determined by the terminal from among the at least one SSB belonging to the first layer and the at least one SSB belonging to the second layer and belongs to a layer having a higher priority among the first layer and the second layer, and each SSB includes at least one of a synchronization signal or a broadcast channel.

The valid SSB(s) may be SSB(s) received at the terminal with a received signal strength greater than or equal to a predetermined threshold.

The method may further comprise: transmitting, to the terminal, configuration information for determining a priority between the first layer and the second layer.

A priority between the first layer and the second layer is determined based on a number of SSBs belonging to the first layer and/or a number of SSBs belonging to the second layer.

The first SSB may be an SSB having a largest received signal strength among the valid SSB(s).

A report of the selected first SSB maybe received from the terminal by receiving a random access preamble from the terminal in uplink resource(s) associated with the selected first SSB.

SSBs belonging to the first layer may be disposed before SSBs belonging to the second layer within an SSB transmission period, or the SSBs belonging to the first layer and the SSBs belonging to the second layer may be disposed in an interlaced manner within the SSB transmission period.

According to exemplary embodiments of the present disclosure, provided is an efficient beam management method for preventing frequent changes of a serving beam by using hierarchical beams in an ultra-high frequency band communication system. Accordingly, the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which.

DETAILED DESCRIPTION OF THE EMBODIMENTS

Figure 1:
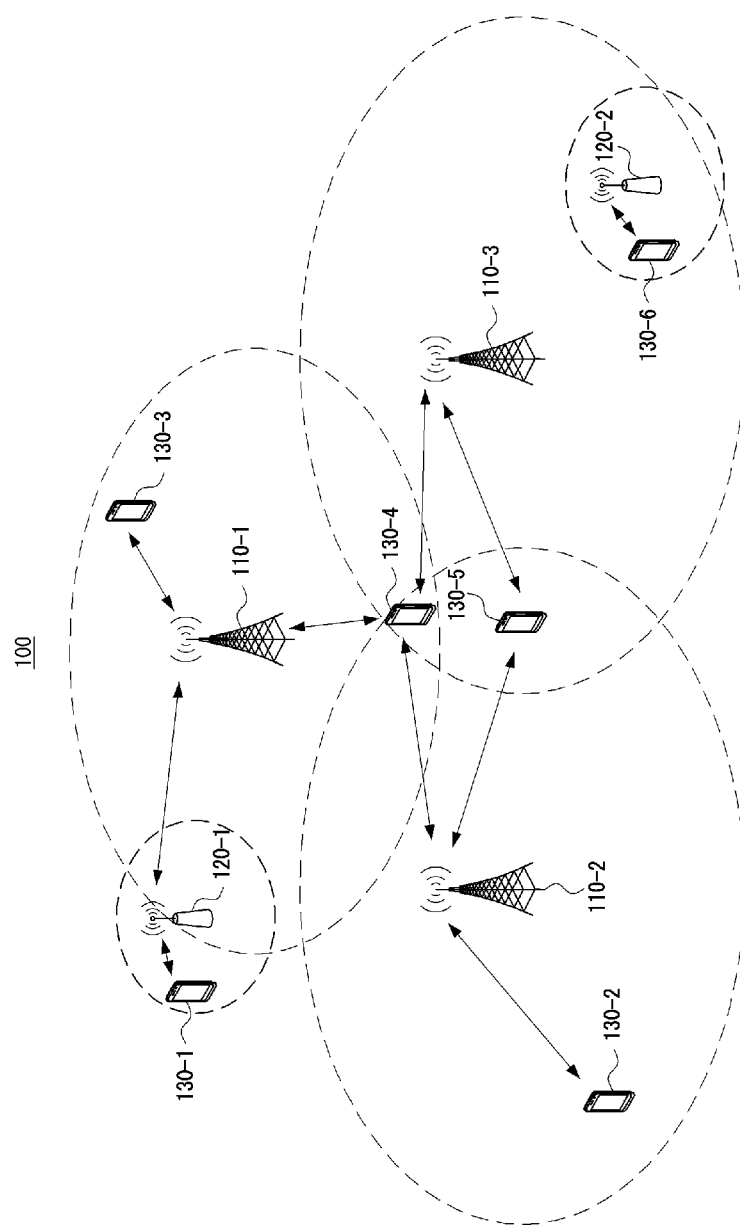
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. 'Configuration of a resource (e.g., resource region)' may mean that configuration information of the corresponding resource is signaled. The signaling may be performed based on at least one of system information (SI) signaling (e.g., transmission of system information block (SIB) and/or master information block (MIB)), RRC signaling (e.g., transmission of RRC parameters and/or higher layer parameters), MAC control element (CE) signaling, PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may mean an apparatus or a device. Exemplary embodiments may be performed by an apparatus or device. A structure of the apparatus (or, device) may be as follows.

Figure 2:
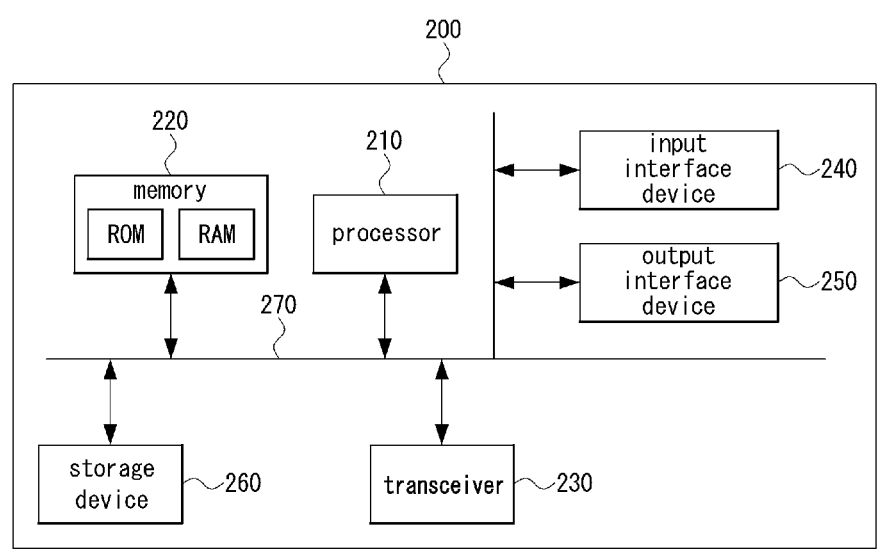
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

The present disclosure relates to an initial access method of a terminal in a communication system, and more particularly, to a method for a terminal to perform initial access by using hierarchical beams in an ultra-high frequency band communication system, and a method for a base station to support the operations of the terminal. In addition, the present disclosure relates to a beam management method using hierarchical beams in the communication system. The following exemplary embodiments may be applied to the NR communication system, and may be applied to other communication systems in addition to the NR communication system (e.g., LTE communication system, a fifth generation (5G) communication system, a sixth generation (6G) communication system, etc.).

A numerology applied to physical signals and channels in the communication system (e.g., NR communication system or 6G communication system) may be variable. The numerology may vary to satisfy various technical requirements of the communication system. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. The subcarrier spacings may have an exponential multiplication relationship of 2, and the CP length may be scaled at the same ratio as the OFDM symbol length. Depending on a frequency band in which the communication system operates, at least some numerologies among the numerologies of Table 1 may be supported. In addition, in the communication system, numerologies not listed in Table 1 may be further supported. CP type(s) not listed in Table 1 (e.g., extended CP) may be additionally supported for a specific subcarrier spacing (e.g., 60 kHz).

Table 1 relates to a first exemplary embodiment of a method for configuring numerologies for a CP-OFDM based communication system.

TABLE 1

| Subcarrier spacing | 15 kHz | 30 kHz | 60 kHz | 120 kHz | 240 kHz | 480 kHz |
|---|---|---|---|---|---|---|
| OFDM symbol length [μs] | 66.7 | 33.3 | 16.7 | 8.3 | 4.2 | 2.1 |
| CP length [μs] | 4.76 | 2.38 | 1.19 | 0.60 | 0.30 | 0.15 |
| Number of OFDM symbols within 1 ms | 14 | 28 | 56 | 112 | 224 | 448 |

In the following description, a frame structure in the communication system will be described. In the time domain, elements constituting a frame structure may include a subframe, slot, mini-slot, symbol, and the like. The subframe may be used as a unit for transmission, measurement, and the like, and the length of the subframe may have a fixed value (e.g., 1 ms) regardless of a subcarrier spacing. A slot may comprise consecutive symbols (e.g., 14 OFDM symbols). The length of the slot may be variable differently from the length of the subframe. For example, the length of the slot may be inversely proportional to the subcarrier spacing.

A slot may be used as a unit for transmission, measurement, scheduling, resource configuration, timing (e.g., scheduling timing, hybrid automatic repeat request (HARD) timing, channel state information (CSI) measurement and reporting timing, etc.), and the like. The length of an actual time resource used for transmission, measurement, scheduling, resource configuration, etc. may not match the length of a slot. A mini-slot may include consecutive symbol(s), and the length of a mini-slot may be shorter than the length of a slot. A mini-slot may be used as a unit for transmission, measurement, scheduling, resource configuration, timing, and the like. A mini-slot (e.g., the length of a mini-slot, a mini-slot boundary, etc.) may be predefined in the technical specification. Alternatively, a mini-slot (e.g., the length of a mini-slot, a mini-slot boundary, etc.) may be configured (or indicated) to the terminal. When a specific condition is satisfied, use of a mini-slot may be configured (or indicated) to the terminal.

The base station may schedule a data channel (e.g., physical downlink shared channel (PDSCH), physical uplink shared channel (PUSCH), physical sidelink shared channel (PSSCH)) using some or all of symbols constituting a slot. In particular, for URLLC transmission, unlicensed band transmission, transmission in a situation where an NR communication system and an LTE communication system coexist, and multi-user scheduling based on analog beamforming, a data channel may be transmitted using a portion of a slot. In addition, the base station may schedule a data channel using a plurality of slots. In addition, the base station may schedule a data channel using at least one mini-slot.

In the frequency domain, elements constituting the frame structure may include a resource block (RB), subcarrier, and the like. One RB may include consecutive subcarriers (e.g., 12 subcarriers). The number of subcarriers constituting one RB may be constant regardless of a numerology. In this case, a bandwidth occupied by one RB may be proportional to a subcarrier spacing of a numerology. An RB may be used as a transmission and resource allocation unit for a data channel, control channel, and the like. Resource allocation of a data channel may be performed in units of RBs or RB groups (e.g., resource block group (RBG)). One RBG may include one or more consecutive RBs. Resource allocation of a control channel may be performed in units of control channel elements (CCEs). One CCE in the frequency domain may include one or more RBs.

In the communication system, a slot (e.g., slot format) may be composed of a combination of one or more of downlink period, flexible period (or unknown period), and an uplink period. Each of a downlink period, flexible period, and uplink period may be comprised of one or more consecutive symbols. A flexible period may be located between a downlink period and an uplink period, between a first downlink period and a second downlink period, or between a first uplink period and a second uplink period. When a flexible period is inserted between a downlink period and an uplink period, the flexible period may be used as a guard period.

A slot may include one or more flexible periods. Alternatively, a slot may not include a flexible period. The terminal may perform a predefined operation in a flexible period. Alternatively, the terminal may perform an operation configured by the base station semi-statically or periodically. For example, the periodic operation configured by the base station may include a PDCCH monitoring operation, synchronization signal/physical broadcast channel (SS/PBCH) block reception and measurement operation, channel state information-reference signal (CSI-RS) reception and measurement operation, downlink semi-persistent scheduling (SPS) PDSCH reception operation, sounding reference signal (SRS) transmission operation, physical random access channel (PRACH) transmission operation, periodically-configured PUCCH transmission operation, PUSCH transmission operation according to a configured grant, and the like. A flexible symbol may be overridden by a downlink symbol or an uplink symbol. When a flexible symbol is overridden by a downlink or uplink symbol, the terminal may perform a new operation instead of the existing operation in the corresponding flexible symbol (e.g., overridden flexible symbol).

A slot format may be configured semi-statically by higher layer signaling (e.g., radio resource control (RRC) signaling). Information indicating a semi-static slot format may be included in system information, and the semi-static slot format may be configured in a cell-specific manner. In addition, a semi-static slot format may be additionally configured for each terminal through terminal-specific higher layer signaling (e.g., RRC signaling). A flexible symbol of a slot format configured cell-specifically may be overridden by a downlink symbol or an uplink symbol by terminal-specific higher layer signaling. In addition, a slot format may be dynamically indicated by physical layer signaling (e.g., slot format indicator (SFI) included in downlink control information (DCI)). The semi-statically configured slot format may be overridden by a dynamically indicated slot format. For example, a semi-static flexible symbol may be overridden by a downlink symbol or an uplink symbol by SFI.

The base station and the terminal may perform downlink operations, uplink operations, and sidelink operations in a bandwidth part. A bandwidth part may be defined as a set of consecutive RBs (e.g., physical resource blocks (PRBs)) having a specific numerology in the frequency domain. RBs constituting one bandwidth part may be consecutive in the frequency domain. One numerology may be used for transmission of signals (e.g., transmission of control channel or data channel) in one bandwidth part. In exemplary embodiments, when used in a broad sense, a 'signal' may refer to any physical signal and channel. A terminal performing an initial access procedure may obtain configuration information of an initial bandwidth part from the base station through system information. A terminal operating in an RRC connected state may obtain the configuration information of the bandwidth part from the base station through terminal-specific higher layer signaling.

The configuration information of the bandwidth part may include a numerology (e.g., a subcarrier spacing and a CP length) applied to the bandwidth part. Also, the configuration information of the bandwidth part may further include information indicating a position of a start RB (e.g., start PRB) of the bandwidth part and information indicating the number of RBs (e.g., PRBs) constituting the bandwidth part. At least one bandwidth part among the bandwidth part(s) configured in the terminal may be activated. For example, within one carrier, one uplink bandwidth part and one downlink bandwidth part may be activated respectively. In a time division duplex (TDD) based communication system, a pair of an uplink bandwidth part and a downlink bandwidth part may be activated. The base station may configure a plurality of bandwidth parts to the terminal within one carrier, and may switch the active bandwidth part of the terminal.

In exemplary embodiments, an RB may mean a common RB (CRB). Alternatively, an RB may mean a PRB or a virtual RB (VRB). In the NR communication system, a CRB may refer to an RB constituting a set of consecutive RBs (e.g., common RB grid) based on a reference frequency (e.g., point A). Carriers, bandwidth part, and the like may be arranged on the common RB grid. That is, a carrier, bandwidth part, etc. may be composed of CRB(s). An RB or CRB constituting a bandwidth part may be referred to as a PRB, and a CRB index within the bandwidth part may be appropriately converted into a PRB index. In an exemplary embodiment, an RB may refer to an interlace RB (IRB).

A minimum resource unit constituting a PDCCH may be a resource element group (REG). An REG may be composed of one PRB (e.g., 12 subcarriers) in the frequency domain and one OFDM symbol in the time domain. Thus, one REG may include 12 resource elements (REs). A demodulation reference signal (DMRS) for demodulating a PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. The NR communication system may support CCE aggregation levels 1, 2, 4, 8, 16, and the like, and one CCE may consist of six REGs.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain.

The symbols constituting one CORESET may be consecutive in the time domain. The PRBs constituting one CORESET may be consecutive or non-consecutive in the frequency domain. One DCI (e.g., one DCI format or one PDCCH) may be transmitted within one CORESET. A plurality of CORESETs may be configured with respect to a cell and a terminal, and the plurality of CORESETs may overlap in time-frequency resources.

A CORESET may be configured in the terminal by a PBCH (e.g., system information or a master information block (MIB) transmitted on the PBCH). The identifier (ID) of the CORESET configured by the PBCH may be 0. That is, the CORESET configured by the PBCH may be referred to as a CORESET #0. A terminal operating in an RRC idle state may perform a monitoring operation in the CORESET #0 in order to receive a first PDCCH in the initial access procedure. Not only terminals operating in the RRC idle state but also terminals operating in the RRC connected state may perform monitoring operations in the CORESET #0. The CORESET may be configured in the terminal by other system information (e.g., system information block type 1 (SIB1)) other than the system information transmitted through the PBCH. For example, for reception of a random access response (or Msg2) in a random access procedure, the terminal may receive the SIB1 including the configuration information of the CORESET. Also, the CORESET may be configured in the terminal by terminal-specific higher layer signaling (e.g., RRC signaling).

In each downlink bandwidth part, one or more CORESETs may be configured for the terminal. The terminal may monitor PDCCH candidate(s) for the CORESET configured in the downlink active bandwidth part. Alternatively, the terminal may monitor PDCCH candidate(s) for a CORESET (e.g., CORESET #0) configured in a downlink bandwidth part other than the downlink active bandwidth part. The initial downlink active bandwidth part may include the CORESET #0 and may be associated with the CORESET #0. The CORESET #0 having a quasi-co-location (QCL) relation with an SS/PBCH block may be configured for the terminal in a primary cell (PCell), a secondary cell (SCell), and a primary secondary cell (PSCell). In the secondary cell (SCell), the CORESET #0 may not be configured for the terminal.

A search space may be a set of candidate resource regions through which PDCCHs can be transmitted. The terminal may perform a blind decoding on each of the PDCCH candidates within a predefined search space. The terminal may determine whether a PDCCH is transmitted to itself by performing a cyclic redundancy check (CRC) on a result of the blind decoding. When it is determined that a PDCCH is a PDCCH for the terminal itself, the terminal may receive the PDCCH. The terminal may periodically monitor the search space, and may monitor the search space at one or more time positions (e.g., PDCCH monitoring occasions, CORESET) within one period.

A PDCCH candidate may be configured with CCEs selected by a predefined hash function within an occasion of the CORESET or the search space. The search space may be defined and configured for each CCE aggregation level. In this case, a set of search spaces for all CCE aggregation levels may be referred to as a 'search space set'. In exemplary embodiments, 'search space' may mean 'search space set', and 'search space set' may mean 'search space'.

A search space set may be logically associated with one CORESET. One CORESET may be logically associated with one or more search space sets. A search space set for transmitting a common DCI or a group common DCI may be referred to as a common search space set (hereinafter, referred to as a 'CSS set'). The common DCI or the group common DCI may include at least one of resource allocation information of a PDSCH for transmission of system information, paging, a power control command, SFI, or a pre-emption indicator. In the case of the NR communication system, the common DCI may correspond to DCI formats 0_0, 1_0, etc., and a cyclic redundancy check (CRC) of the common DCI may be scrambled by a system information-radio network temporary identifier (SI-RNTI), paging-RNTI (P-RNTI), random access-RNTI (RA-RNTI), temporary cell-RNTI (TC-RNTI), or the like. The group common DCI may correspond to a DCI format 2_X (X=0, 1, 2, . . . ), or the like, and a CRC of the group common DCI may be scrambled by a slot format indicator-RNTI (SFI-RNTI) or the like. The CSS set may include Type 0, Type 0A, Type 1, Type 2, and Type 3 CSS sets.

A search space set for transmitting a UE-specific DCI may be referred to as a UE-specific search space set (hereinafter, referred to as a 'USS set'). The UE-specific DCI may include scheduling and resource allocation information for a PDSCH, PUSCH, PSSCH, or the like. In the case of the NR communication system, the UE-specific DCI may correspond to DCI formats 0_1, 0_2, 1_1, 1_2, 3_0, 3_1, or the like, and a CRC of the UE-specific DCI may be scrambled by a C-RNTI, configured scheduling-RNTI (CS-RNTI), modulation and coding scheme-C-RNTI (MCS-C-RNTI), or the like. In consideration of scheduling freedom or fallback transmission, a UE-specific DCI may be transmitted even in a CSS set. In this case, the UE-specific DCI may be transmitted according to the DCI format corresponding to the common DCI. For example, the terminal may monitor a PDCCH (e.g., DCI formats 0_0, 0_1) whose CRC is scrambled with a C-RNTI, CS-RNTI, MCS-C-RNTI, or the like in the CSS set.

The Type 0 CSS set may be used for receiving a DCI scheduling a PDSCH including an SIB1, and may be configured through a PBCH or cell-specific RRC signaling. The ID of the Type 0 CSS set may be assigned as or set to 0. The type 0 CSS set may be logically combined with the CORESET #0.

The terminal may assume that a PDCCH DM-RS has a QCL relationship with a certain signal (e.g., SS/PBCH block, CSI-RS, PDSCH DM-RS, PDCCH DM-RS, or the like). In addition, since a PDCCH has the same antenna port as a corresponding PDCCH DM-RS, the PDCCH and the PDCCH DM-RS may have a QCL relationship with each other. Therefore, the terminal may acquire information on large-scale propagation characteristics of a radio channel experienced by the PDCCH and the PDCCH DM-RS through the QCL assumption, and may utilize the information on the large-scale propagation characteristics for channel estimation, reception beamforming, and the like. A QCL parameter may include at least one of a delay spread, Doppler spread, Doppler shift, average gain, average delay, or spatial Rx parameter. The spatial Rx parameter may correspond to at least one characteristic of a reception beam, reception channel spatial correlation, or transmission/reception beam pair. For convenience, the spatial Rx parameter may be referred to as 'spatial QCL'. The PDCCH may be used in a sense including the PDCCH DM-RS, and an expression that the PDCCH has a QCL relationship with a certain signal may include the meaning that the PDCCH DM-RS of the PDCCH has a QCL relationship with the certain signal. A signal having a QCL relationship with the PDCCH or a resource thereof may be referred to as a QCL source, QCL source signal, QCL source resource, or the like.

PDCCHs transmitted in the same CORESET (and a search space set, PDCCH monitoring occasions, etc. corresponding thereto) may have the same QCL relationship. That is, a unit of a set for which the terminal assumes the same QCL may be a CORESET, and the QCL assumption for each of the CORESETs may be independent. In an exemplary embodiment, a QCL, QCL source, etc. of a certain CORESET may mean a QCL, QCL source, etc. of a PDCCH received through the corresponding CORESET, respectively. Exceptionally, different QCL assumptions may be applied to search space sets corresponding to one CORESET. For example, a search space set for monitoring an RA-RNTI (e.g., Type 1 CSS set) and other search space sets may have different QCL relationships.

A QCL relationship or QCL assumption (e.g., QCL source, QCL type, etc.) of a CORESET may be determined by a predefined method. For example, the terminal may assume that a PDCCH DM-RS received through a certain CORESET or a certain search space set has a QCL relationship, with respect to a predefined QCL type, with an SS/PBCH block and/or CSI-RS selected in an initial access or random access procedure. Here, the QCL type may mean a set of one or more QCL parameter(s). Alternatively, a QCL relationship or QCL assumption (e.g., QCL source, QCL type, etc.) of a CORESET may be signaled from the base station to the terminal (e.g., through RRC signaling, medium access control (MAC) control element (CE) signaling, DCI signaling, or a combination thereof). That is, the base station may configure a transmission configuration information (TCI) state for a CORESET to the terminal. In general, the TCI state may include an ID of a signal (e.g., a QCL source or QCL source resource of a PDCCH DM-RS) having a QCL relationship with a DM-RS (e.g., the PDCCH DM-RS) of a physical channel to which the TCI is applied, and/or at least one QCL type thereof. For example, the base station may configure one or more TCI state candidates for each CORESET to the terminal through RRC signaling, and may indicate or configure one TCI state to be used for CORESET monitoring of the terminal from among the one or more TCI state candidates to the terminal through MAC signaling (or DCI signaling). When there is one TCI state candidate configured by RRC signaling, the MAC signaling procedure (or DCI signaling procedure) may be omitted. The terminal may perform PDCCH monitoring and reception operations for the corresponding CORESET based on the TCI state configuration information received from the base station.

In a communication system, beam operations of a high frequency band and a low frequency band may be different from each other. Since a path loss of signals due to a channel is relatively small in a low frequency band (e.g., a band of 6 GHz or below), a signal may be transmitted/received using a beam having a wide beamwidth. In particular, in case of a control channel, the entire coverage of a cell (or sector) may be covered even with a single beam. However, in a high frequency band (e.g., a band of 6 GHz or above) having a large signal path loss, beamforming by a large-scale antenna may be used to extend the coverage. In addition, beamforming may be applied not only to data channels but also to common signals and control channels. A communication node (e.g., base station) may form beams having a small beam width through a plurality of antennas, and transmit and receive a signal multiple times by using a plurality of beams having different directivity to cover the entire spatial area of a cell (or sector). An operation of repeatedly transmitting a signal in a plurality of time resources by using a plurality of beams may be referred to as a beam sweeping operation. A system for transmitting a signal using a plurality of beams having such a narrow beam width may be referred to as a multi-beam system.

For the multi-beam system operation, the base station may manage transmission and reception beams of a terminal. Also, the terminal may manage its own transmission and reception beams. The terminal may measure a beam quality with respect to a signal (e.g., SSB, CSI-RS, etc.) transmitted from the base station or a transmission and reception point (TRP), and may report a measurement result of the beam quality to the base station. For example, the terminal may calculate a beam quality measurement value such as reference signal received power (RSRP) and signal-to-interference-plus-noise ratio (SINR) for each beam (e.g., each signal or resource), and report the optimal beam(s) and measurement value(s) corresponding thereto to the base station. The base station may determine a transmission beam for the terminal based on the beam quality measurement values received from the terminal. In addition, based on the beam quality measurement values received from the terminal, the base station may configure information (e.g., QCL information, TCI state information, etc.) required for the terminal to receive physical signals and channels (e.g., PDCCH, PDSCH, CSI-RS, PUCCH, PUSCH, SRS, PRACH, etc.) to the terminal. In exemplary embodiments, unless otherwise specified, 'beam' may refer to 'transmission beam', 'reception beam', and/or 'transmission/reception beam pair'.

Also, the terms 'beam', 'transmission beam', 'reception beam', and 'transmission/reception beam pair' may be used in the same sense. Hereinafter, 'transmission beam' may correspond to 'precoder', 'beamformer', 'transmission spatial filter', and the like, and information on a transmission beam may include information on a precoder, beamformer, transmission spatial filter, transmission spatial relationship information, spatial transmission parameters, and the like corresponding thereto. In addition, 'reception beam' may correspond to 'reception filter', 'reception spatial filter', 'reception beamformer', and the like, and information on a reception beam may include information on a reception filter, reception spatial filter, reception beamformer, or the like, information on a spatial QCL, information on QCL type D, reception spatial relationship information, spatial reception parameters, and the like. Also, hereinafter, 'multi-beam' may mean at least one beam(s).

In exemplary embodiments, a base station or serving cell may include one TRP, and downlink and uplink coverage may be formed by the TRP. A terminal may perform both an operation of receiving a downlink signal from the TRP and an operation of transmitting an uplink signal to the TRP. In this case, beamforming may be applied to downlink reception and uplink transmission. For example, the TRP may apply a first beam to signal transmission/reception with the terminal, and the terminal may apply a second beam to signal transmission/reception with the TRP (or base station). A transmission beam (or transmission spatial filter) of the terminal may be formed based on a reception beam (or, reception spatial filter, beam quality measurement for a received signal) of the terminal. In addition, a transmission beam (or transmission spatial filter) of the base station may be formed based on a reception beam (or, reception spatial filter, beam quality measurement for a received signal) of the base station. That is, beam correspondence may be established between the transmission beam and the reception beam of the communication node. Hereinafter, for convenience of description, when a communication node transmits or receives a beam, it may mean that a signal is transmitted or received through the corresponding beam.

The base station (or TRP) may transmit synchronization signals, broadcast information, etc. to the terminal(s) by using multiple beams. For example, one or more resources may be defined or configured for transmission of the PSS, SSS, PBCH, SSB, PDCCH, PDSCH, etc., and the signals may be repeatedly transmitted in the one or more resources through a beam sweeping operation. The signals may be referred to as initial access signals. In addition, a set of signals including a synchronization signal may be transmitted together to the terminal(s), which may be referred to as a synchronization signal block (SSB). The signals constituting the SSB may be predefined in a technical specification. The SSB may further include the above-described signals in addition to the synchronization signal, and may be repeatedly transmitted through a beam sweeping operation as described above. In the NR communication system, the SSB may mean a synchronization signal/physical broadcast channel (SS/PBCH) block, and an SSB resource may mean an SS/PBCH block resource.

The terminal may determine a resource for receiving an initial access signal and/or a beam corresponding thereto from among the one or more resources, and may receive an initial access signal in the determined resource (based on the determined beam). For example, the terminal may determine a resource having the largest received signal strength measurement value (e.g., reference signal received power (RSRP) or L1-RSRP) of the initial access signal as a reception resource, and determine a beam corresponding thereto as a 'downlink initial beam'. The downlink initial beam may be a transmission beam of the base station. The terminal may receive the initial access signal and obtain a cell ID, downlink timing, broadcast information, system information (e.g., master information block (MIB), system information block (SIB), or the like), and/or the like. For example, the initial access signal may be the SSB. The terminal may perform a random access procedure based on the reception resource and/or the beam of the initial access signal.

Figure 3:
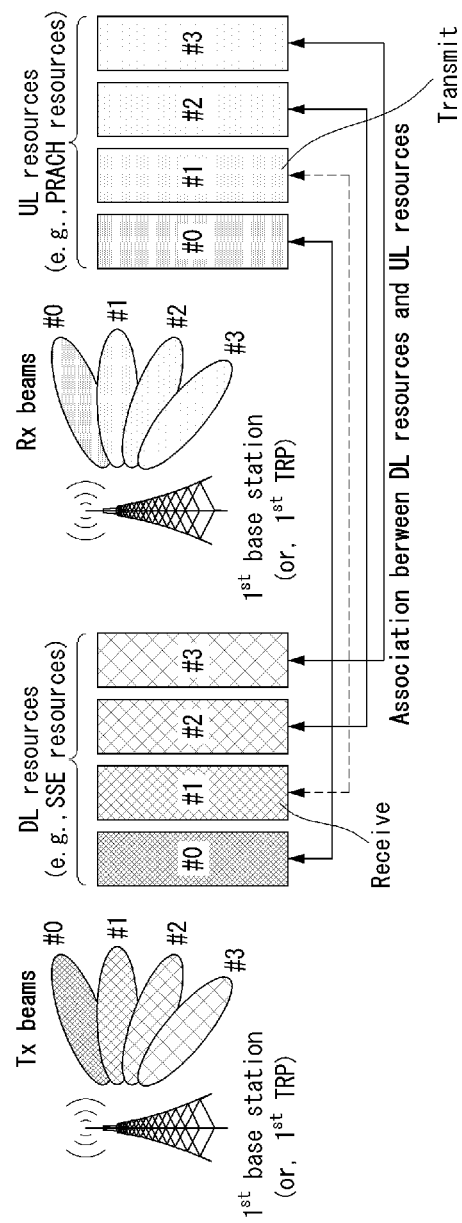
FIG. 3 is a conceptual diagram illustrating a first exemplary embodiment of an initial access method based on association between downlink resource(s) and uplink resource(s).

FIG. 3 is a conceptual diagram illustrating a first exemplary embodiment of an initial access method based on association between downlink resource(s) and uplink resource(s).

Referring to FIG. 3, downlink resource(s) (e.g., downlink resource(s) for initial access) and uplink resource(s) (e.g., uplink resource(s) for random access) may be associated with each other. For example, the downlink resource(s) may be SSB transmission resource(s). In addition, the uplink resource(s) may be PRACH transmission resource(s). As described above, the base station may repeatedly transmit the initial access signal through multiple beams using the downlink resource(s). In the present exemplary embodiment, the terminal may receive the initial access signal (e.g., SSB or CSI-RS) in a downlink resource #1 (e.g., SSB resource #1 or CSI-RS resource #1) which is one of four downlink resources (e.g., SSB resources or CSI-RS resources).

The base station may configure the downlink resource(s) and the uplink resource(s) to the terminal (e.g., the terminal may receive configuration information of the downlink resource(s) and the uplink resource(s)), and the terminal may receive information on an association relationship between the uplink resource(s) and the downlink resource(s) from the base station. Each of the uplink resource(s) may be associated with one or more downlink resource(s). That is, the downlink resource(s) and the uplink resource(s) may correspond one-to-one or many-to-one. Alternatively, a plurality of uplink resource(s) may be associated with one downlink resource. That is, the downlink resource(s) and the uplink resource(s) may correspond one-to-many. Referring to FIG. 3, the terminal may be configured with four SSB resources and four PRACH resources. In addition, an association relationship may be established between the four SSB resources and the four PRACH resources. For example, SSB resources #0, #1, #2, and #3 may be associated with PRACH resources #0, #1, #2, and #3, respectively.

Figure 4:
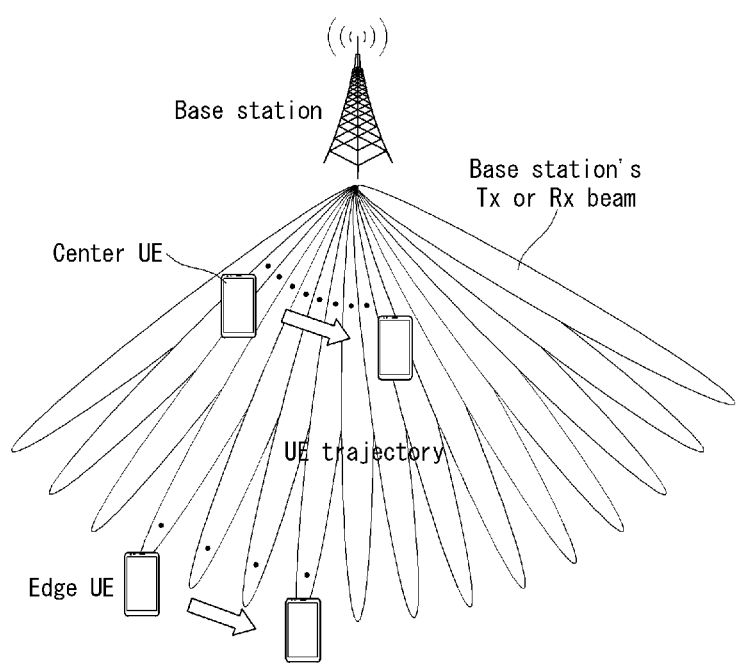
FIG. 4 is a conceptual diagram for describing changes in a serving beam of a terminal due to mobility of the terminal.

The terminal may transmit a PRACH in an uplink resource mutually associated with the downlink resource in which the initial access signal is received. Referring to FIG. 4, the terminal may transmit a PRACH in a PRACH resource #1 associated with the downlink resource #1 (e.g., SSB resource #1 or CSI-RS resource #1) in which the initial access signal (e.g., SSB or CSI-RS) is received. In this case, a transmission beam of the PRACH may be generated based on a reception beam of the initial access signal (e.g., SSB or CSI-RS). In addition, a resource or beam of another uplink signal for random access (e.g., Msg3 PUSCH, MsgA PUSCH, PUCCH including a HARQ response message for Msg4, or the like) may be determined based on the downlink resource or beam in which the terminal receives the initial access signal (e.g., SSB or CSI-RS) or the uplink resource or beam in which the terminal transmits the PRACH. For example, an uplink transmission beam and a downlink reception beam of the terminal may have the same or similar directionality. The base station may successfully receive the PRACH from the terminal using beams having the same or similar directionality for transmission and reception of the downlink resource and the uplink resource associated with each other, and may identify the downlink resource (e.g., SSB resource or SSB) and the downlink initial beam selected by the terminal based on the association relationship. That is, the terminal may report the initial beam to the base station in an implicit manner through the above-described method. An uplink beam corresponding to the downlink initial beam may be referred to as an uplink initial beam.

In the present disclosure, a PRACH resource may mean a PRACH occasion (or PRACH occasion resource). A random access preamble (or sequence) may be mapped to a PRACH resource one or more times, and a PRACH resource may further include a cyclic prefix (CP), a guard period, and the like. A PRACH resource or PRACH occasion may be disposed in one or more slot(s) in the time domain and may include one or more symbol(s). In addition, a PRACH resource or PRACH occasion may include one or more RB(s) or subcarrier(s) in the frequency domain.

Meanwhile, a path loss of a signal has a positive correlation with a frequency band (i.e., frequency value) in which the signal is transmitted. In an ultra-high frequency band (e.g., millimeter wave band, terahertz band, or the like) communication, since a path loss of a signal is very large, an ultra-fine beam having a very small beamwidth may have to be used to provide a target coverage. As a beamwidth decreases, a beam arrival distance may increase, but a beam quality may be rapidly deteriorated even due to a small movement of a terminal or a small variation in a channel state, and frequent beam changes may be required.

FIG. 4 is a conceptual diagram for describing changes in a serving beam of a terminal due to mobility of the terminal.

Referring to FIG. 4, a base station may transmit/receive signals using a plurality of beams having a very small beamwidth. For example, initial access signals (e.g., SSBs) may be repeatedly transmitted using the plurality of beams. Similarly, the base station may receive random access uplink signals (e.g., PRACHs) of terminals using the plurality of beams. In addition, the base station may transmit a signal to a terminal by using some (e.g., the best transmission beam) among the plurality of beams, and receive a signal transmitted from the terminal by using some (e.g., the best reception beam) among the plurality of beams. The best transmission beam or the best reception beam for the terminal may be referred to as a serving beam. In this case, when the terminal moves as shown in FIG. 4 (e.g., when it moves in a direction orthogonal to a beam direction), the serving beam of the terminal may be frequently changed because the beams have a narrow beamwidth. In addition, assuming that terminals move the same distance, a serving beam for a terminal located at the center of the cell or a terminal located relatively close to the base station (herein-after, referred to as a 'cell center terminal' or 'cell center UE') may be changed more frequently than a serving beam for a terminal located at an edge of the cell or a terminal located relatively far from the base station (hereinafter, referred to as a 'cell edge termina' or 'cell edge UE'). Such the frequent changes of the serving beam may increase a beam management load, and may decrease reliability of beam qualities, thereby degrading the signal reception performance. In particular, the frequent changes in a beam for control channels may have a significant adverse effect on the system performance.

[Mutual Association Between SSBs]

As a method for solving the above-described problem, beams having different beamwidths may be used for signal transmission. For example, beams having a narrow beamwidth and beams having a wide beamwidth may be used. The beams with a narrow beamwidth may be used for a cell edge terminal and a cell center terminal, and the beams with a wide beamwidth may be used for a cell center terminal. The beams with different beamwidths may be referred to as 'layered or hierarchical beams', 'heterogeneous beams', or the like.

Figure 5:
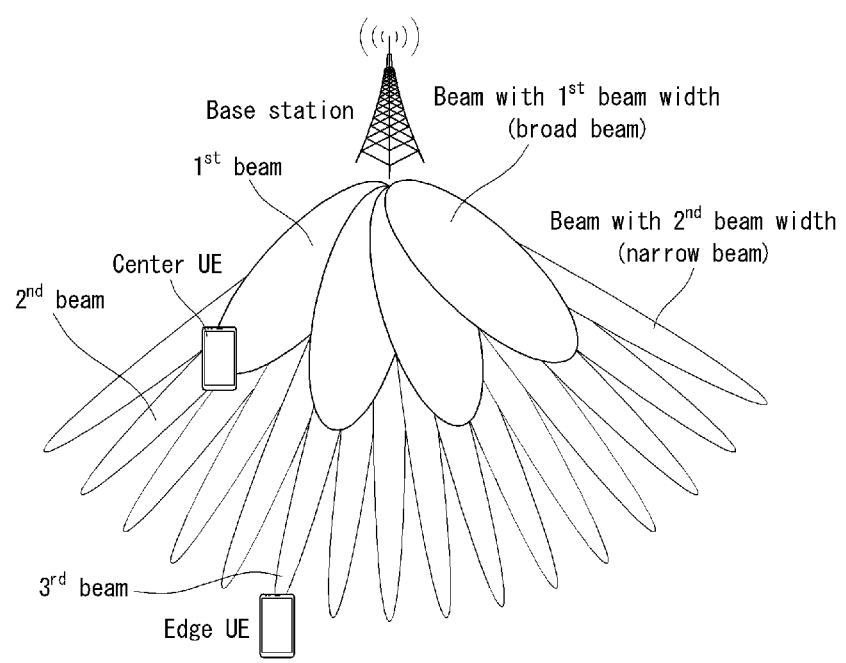
FIG. 5 is a conceptual diagram for describing a first exemplary embodiment of a signal transmission method using hierarchical beams.

FIG. 5 is a conceptual diagram for describing a first exemplary embodiment of a signal transmission method using hierarchical beams.

Referring to FIG. 5, a base station may transmit/receive signals using a plurality of beams having different beamwidths. For example, some beams may have a first beamwidth and some other beams may have a second beamwidth. Without loss of generality, the first beamwidth may be considered wider than the second beamwidth. The initial access signal (e.g., SSB) may be repeatedly transmitted using the beams having the first beamwidth and the beams having the second beamwidth. In addition, the random access uplink signal (e.g., PRACH) of the terminal may be received using the beams having the first beamwidth and the beams having the second beamwidth. The beams having the second beamwidth (i.e., narrow beamwidth) may be used for a cell edge terminal and a cell center terminal, and the beams having the first beamwidth (i.e., wide beamwidth) may be used for a cell center terminal. As shown in FIG. 5, a first beam having the first beamwidth and a second beam having the second beamwidth may be used as a serving beam for a cell center terminal, and a third beam having the second beamwidth may be used as a serving beam for a cell edge terminal.

When a cell center terminal uses the first beam with a wide beamwidth as the serving beam, a beam management load thereof may be relaxed. However, according to the method described above, the cell center terminal may determine the first beam or the second beam as a downlink initial beam based on measurement values of received signal strengths of the initial access signals (e.g., SSBs), and may select the second beam as the downlink initial beam when the received signal strength of the second beam is greater. In general, since a beamforming gain of the second beam having a narrow beamwidth is greater than a beamforming gain of the first beam having a wide beamwidth, when both directionality of the first beam and the second beam are aligned with a position of the terminal, the terminal may be more likely to select the second beam as the serving beam. Accordingly, it may be difficult to utilize the beams having the first beamwidth, and the above-described beam management problem may not be solved.

Therefore, there is a need for a method in which a terminal selects a beam having a specific beamwidth (e.g., the first beamwidth, the beam having a wide beamwidth) as an initial beam, and reports the selected beam to the base station. Specific methods therefor will be described below. In exemplary embodiments below, SSBs and PRACHs will be mainly considered as initial access signals, but proposed methods may be easily applied to other signals to which beam sweeping is applied (e.g., other initial access signals, signals other than the initial access signals). Meanwhile, in the following description, selection of a certain beam as an 'initial beam' may mean that the corresponding beam is used for an 'initial access procedure'. In addition, an operation of performing an initial access procedure using a certain beam may include at least one among an operation of receiving a downlink signal for initial access based on the corresponding beam, an operation of transmitting an uplink signal for initial access based on the corresponding beam, or a combination thereof. First, SSB layers (or, SSB groups or SSB sets) may be defined for classifying beams having different beamwidths. A plurality of SSB layers may be defined or configured, and each SSB may correspond to or belong to one of the plurality of SSB layers. For example, SSBs having a first beamwidth may belong to a first SSB layer, and SSBs having a second beamwidth may belong to a second SSB layer. Additionally or alternatively, SSB layers (or, SSB groups or SSB sets) may be defined for classifying different transmission and reception points (TRPs), transmission points (TPs), reception points (RPs), panels, or the like. For example, SSBs transmitted from a first TRP (or, TP, RP, panel, or the like) may belong to a first SSB layer, and SSBs transmitted from a second TRP (or, TP, RP, panel, or the like) may belong to a second SSB layer. The TRPs corresponding to the SSB layers may belong to a same serving cell. That is, SSBs belonging to the first SSB layer and SSBs belonging to the second SSB layer may deliver a same physical cell identity (PCID) to a terminal. Alternatively, the TRPs corresponding to the SSB layers may belong to different serving cells. In this case, SSBs belonging to the first SSB layer and SSBs belonging to the second SSB layer may deliver different PCIDs to a terminal. In addition, SSBs belonging to each SSB layer may deliver a TRP ID or information corresponding to a TRP ID associated to each SSB layer to a terminal. The SSBs belonging to the first SSB layer may be referred to as a first SSB set, a first SSB group, or the like, and the SSBs belonging to the second SSB layer may be referred to as a second SSB set, a second SSB group, or the like.

Figure 6:
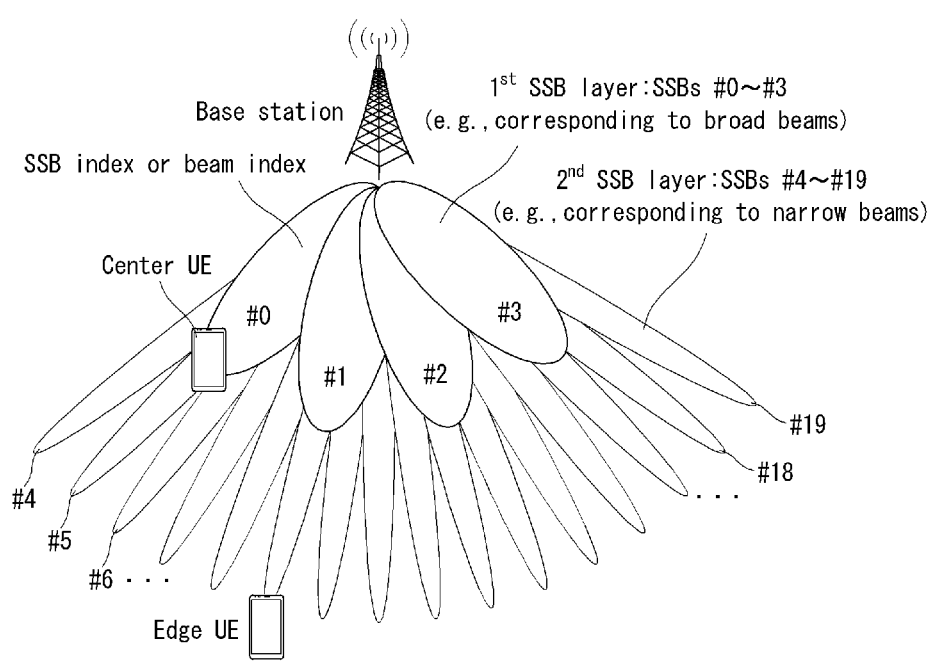
FIG. 6 is a conceptual diagram for describing a second exemplary embodiment of a signal transmission method using hierarchical beams.

FIG. 6 is a conceptual diagram for describing a second exemplary embodiment of a signal transmission method using hierarchical beams.

Referring to FIG. 6, a base station may transmit SSBs 20 times by using different beams. An SSB #n (i.e., SSB having an index n) may correspond to a beam #n (i.e., beam having an index n) (n is an integer greater than or equal to 0). For example, SSBs #0 to #3 may correspond to beams #0 to #3, respectively, and the beams may be beams having a wide beamwidth. In addition, SSBs #4 to #19 may correspond to beams #4 to #19, respectively, and the beams may be beams having a narrow beamwidth. In this case, the SSBs may be classified into a plurality of SSB layers. For example, the SSBs #0 to #3 may belong to a first SSB layer (or, first SSB set, first SSB group, or the link), and the SSBs #4 to #19 may belong to a second SSB layer (or, second SSB set, second SSB group, or the like). The first SSB layer may include $N_1$(=4) SSBs corresponding to the beams having a wide beamwidth, and the second SSB layer may include $N_2$ (=16) SSBs corresponding to the beams having a narrow beamwidth (each of $N_1$ and $N_2$ is a natural number or an integer greater than or equal to 0).

The plurality of SSBs may be associated with each other. A quasi-co-location (QCL) relationship may be established between the associated SSBs. For example, the terminal may assume that a spatial QCL relationship (e.g., spatial reception parameters, QCL type D, or the like) is established between a first SSB and a second SSB associated with each other. Based on the above assumption, the terminal may receive the first SSB and the second SSB using the same reception beam. From a viewpoint of the reception operation of the terminal, the first SSB and the second SSB may be simultaneously received. That is, the terminal may receive both the first SSB and the second SSB in the same symbol(s). In addition, it may be assumed that other types of QCL relationship (e.g., delay spread, Doppler spread, Doppler shift, average gain, average delay, or the like) are established between the associated SSBs. Alternatively, the other types of QCL relationship (e.g., delay spread, Doppler spread, Doppler shift, average gain, average delay, or the like) may not be established between the associated SSBs.

CORESETs corresponding to a plurality of SSBs associated with each other may be associated with each other. For example, a first SSB and a second SSB may be associated with each other, and a first CORESET corresponding to the first SSB and a second CORESET corresponding to the second SSB may be associated with each other. The first CORESET and the second CORESET may be CORESETs (e.g., CORESET #0) having the same ID, and resource locations of the first CORESET and the second CORESET may be determined based on resource locations of the first SSB and the second SSB and/or information indicated by the first SSB and the second SSB, respectively. The CORESET may include a CSS set, and the CSS set may include a type 0, 0A, 1, or 2 PDCCH CSS set. The terminal may assume that a QCL relationship (e.g., spatial QCL, spatial reception parameters, QCL type D) is established between the CORESETs associated with each other, and based on the assumption, the terminal may perform monitoring and reception on the CORESETs associated with each other using the same reception beam. From a viewpoint of the reception operation of the terminal, the terminal may simultaneously receive the CORESETs associated with each other in the same symbol(s).

A plurality of SSBs belonging to different SSB layers may be associated with each other. In the above-described exemplary embodiment, an SSB belonging to the first SSB layer and an SSB belonging to the second SSB layer may be associated with each other. In addition, an SSB corresponding to a beam having a wide beamwidth and an SSB corresponding to a beam having a narrow beamwidth may be associated with each other. The terminal may receive the plurality of SSBs belonging to different SSB layers by using the same reception beam based on the association relationship or QCL relationship. That is, the terminal may receive a beam having a wide beamwidth (i.e., transmission beam of the base station) and a beam having a narrow beamwidth (i.e., transmission beam of the base station) using the same reception beam. Hereinafter, the above-described method may be referred to as (Method 100).

In the present disclosure, the QCL relationship established between the first SSB and the second SSB may mean that a signal (e.g., PSS/SSS, PBCH DM-RS, CSI-RS, or the like) or a channel (e.g., PBCH) constituting the first SSB can be used as a QCL source of a signal (e.g., PSS/SSS, PBCH DM-RS, CSI-RS, or the like) or a channel (e.g., PBCH) constituting the second SSB. Additionally or alternatively, the QCL relationship established between the first SSB and the second SSB may mean that a signal (e.g., PSS/SSS, PBCH DM-RS, CSI-RS, or the like) or a channel (e.g., PBCH) constituting the second SSB can be used as a QCL source of a signal (e.g., PSS/SSS, PBCH DM-RS, CSI-RS, or the like) or a channel (e.g., PBCH) constituting the first SSB. Additionally or alternatively, the QCL relationship between the first SSB and the second SSB may mean that a signal (e.g., PSS/SSS, PBCH DM-RS, CSI-RS, or the like) constituting the first SSB and a signal (e.g., PSS/SSS, PBCH DM-RS, CSI-RS, or the like) constituting the second SSB share the same QCL source with respect to specific QCL parameter(s). In addition, the terminal may receive a first signal having a QCL relationship with the first SSB and a second signal having a QCL relationship with the second SSB. In this case, the terminal may receive the first signal based on the second SSB as well as the first SSB, and may receive the second signal based on the first SSB as well as the second SSB. In addition, the terminal may assume that a QCL relationship is established between the first signal and the second signal.

Here, the first SSB and the second SSB may be SSBs belonging to the same serving cell. The first SSB and the second SSB may include the same physical layer cell ID or information corresponding thereto. The first SSB and the second SSB may be mapped on the same (active) bandwidth part and may be transmitted to the terminal. The first SSB and the second SSB may be cell-defining SSBs defining a cell. Alternatively, only some of the first SSB and the second SSB may be used as cell-defining SSB(s) for at least some terminals.

Figure 7:
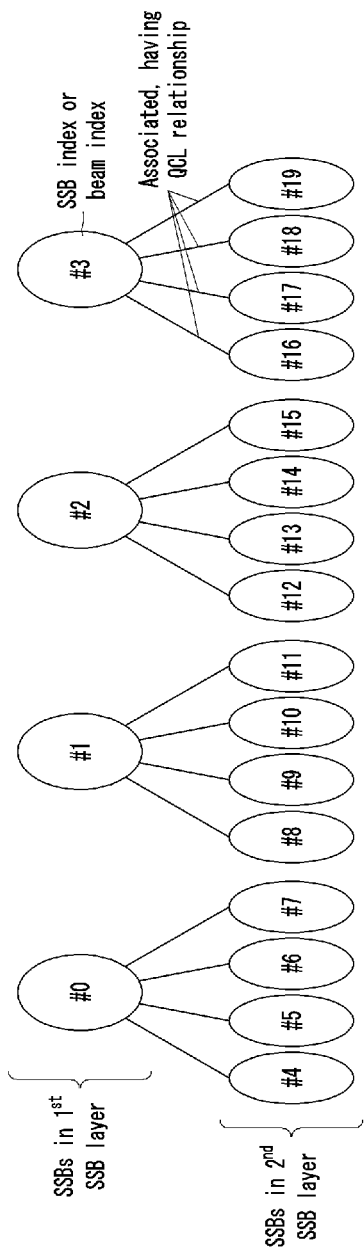
FIG. 7 is a conceptual diagram for describing association relationships and QCL relationships between SSBs.

FIG. 7 is a conceptual diagram for describing association relationships and QCL relationships between SSBs.

Referring to FIG. 7, SSBs may be classified into a first SSB layer and a second SSB layer, and SSBs belonging to the first SSB layer and SSBs belonging to the second SSB layer may be associated with each other. For example, an SSB #0 belonging to the first SSB layer may be associated with SSBs #4 to #7 belonging to the second SSB layer, respectively. In addition, a QCL relationship may be established between the SSBs associated with each other. For example, the SSB #0 may be quasi-co-located (QCLed) with the SSBs #4 to #7, respectively. This may not necessarily mean that the SSBs #4 to #7 have a QCL relationship with each other. For example, from the association relationship, the terminal may not assume that the SSB #4 and the SSB #5 are QCLed.

Information on the above-described SSB layers (or SSB sets, SSB groups), information indicating an association relationship (or QCL relationship) between the SSBs, or the like may be configured by the base station to the terminal through a signaling procedure (e.g., RRC signaling, MAC signaling, DCI, or a combination thereof). For example, the information may be transmitted to the terminal as being included in system information (e.g., SIB-1, SIB, MIB, and/or the like). Alternatively, at least a part of the information may be defined in a technical specification and shared in advance between the base station and the terminal. For example, the terminal may determine an SSB layer to which a certain SSB belongs based on an SSB index or the like of the SSB. For example, SSBs corresponding to the lowest $N_1$ indices may belong to the first SSB layer, and SSBs corresponding to the highest $N_2$ indices may belong to the second SSB layer. In this case, the base station may inform the terminal of information on $N_1$ and $N_2$.

At least some of the information may be derived based on other information without being directly signaled to the terminal. According to an exemplary embodiment, the information on the SSB layers (or SSB sets, SSB groups) may not be directly signaled to the terminal. The terminal may find out configuration of the SSB layers from the association relationship (or QCL relationship) between the SSBs. For example, the terminal may consider that the associated SSBs belong to different SSB layers (or SSB sets, SSB groups). For example, the base station may indicate to the terminal that the SSB #0 is associated with the SSBs #4 to #7, and based thereon, the terminal may consider that the SSB layer to which the SSB #0 belongs and the SSB layer to which the SSBs #4 to #7 belong are different from each other.

According to another exemplary embodiment, the association relationship (or QCL relationship) between the SSBs may not be directly signaled to the terminal. The terminal may find out the association relationship between the SSBs from the information on the configuration of the SSB layers (or SSB sets, SSB groups). For example, the terminal may receive information on the number $N_1$ of the SSBs belonging to the first SSB layer and the number $N_2$ of the SSBs belonging to the second SSB layer from the base station. In this case, each SSB belonging to the first SSB layer may be associated with $N_2/N_1$ SSBs belonging to the second SSB layer. This may be true when $N_2 \geq N_1$. Alternatively, each SSB belonging to the second SSB layer may be associated with $N_1/N_2$ SSBs belonging to the first SSB layer. This may be true when $N_1 \geq N_2$. According to the above exemplary embodiment, $N_1$ may be 4 and $N_2$ may be 16. For example, each SSB belonging to the first SSB layer may be associated with 4 ($=N_2/N_1$) SSBs belonging to the second SSB layer. The mapping may be applied in ascending order (or descending order) of the SSB indices in each SSB layer. For example, the SSB #0 of the first SSB layer may be associated with the SSBs #4 to #7 of the second SSB layer, the SSB #1 of the first SSB layer may be associated with the SSBs #8 to #11 of the second SSB layer, and the same rule may be repeatedly applied to the remaining SSBs.

As a method different from (Method 100), the above-described association relationship between the SSBs may be applied without distinction of the SSB layers (or SSB sets, SSB groups) or regardless of the SSB layers. For example, the terminal may receive configuration information on the association relationship and the QCL relationship between the $N_1$ SSBs and the $N_2$ SSBs from the base station. The terminal may assume that each of the $N_1$ SSBs is associated with $N_2/N_1$ SSBs or that each of the $N_2$ SSBs is associated with $N_1/N_2$ SSBs according to the above-described method without applying the concept of SSB layers. Similarly, a QCL relationship may be established between the associated SSBs.

Each SSB (or each SSB resource) may belong to one SSB layer (or, SSB set or SSB group). Alternatively, each SSB (or each SSB resource) may belong to a plurality of SSB layers (or, SSB sets or SSB groups). For example, an SSB having a wide beamwidth (e.g., SSB #0) may belong to both the first SSB layer and the second SSB layer, and an SSB having a narrow beamwidth (e.g., SSB #4) may belong only to the second SSB layer. That is, the first SSB layer may include all SSBs belonging to the second SSB layer. In this case, even when SSBs belong to the same SSB layer, an association relationship and a QCL relationship may be established between the SSBs.

In exemplary embodiments, the SSB layer may mean an SSB group, an SSB set, or the like, and each SSB layer may include one or more SSB(s). Alternatively, in order to achieve a special purpose, a certain SSB layer may be configured not to include SSBs at all.

Figure 8:
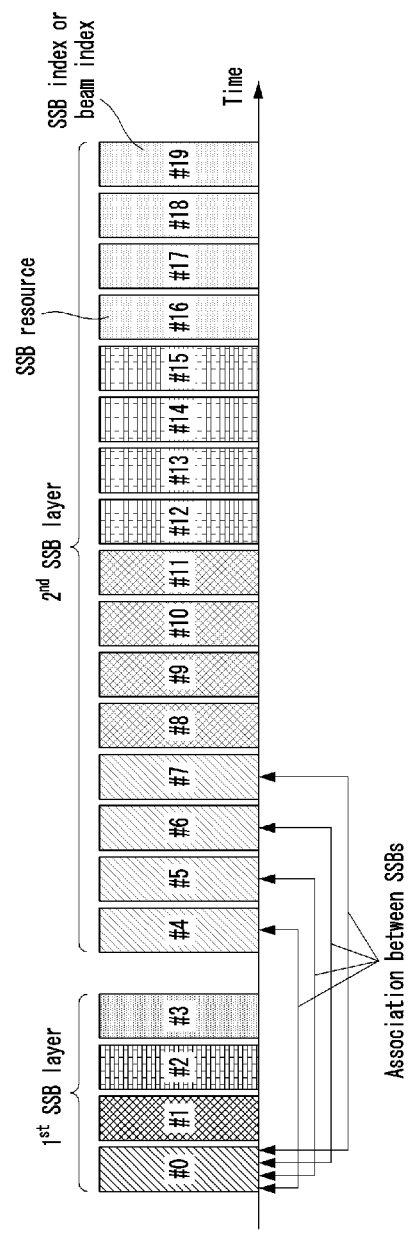
FIG. 8 is a conceptual diagram for describing a first exemplary embodiment of arrangement of SSB resources and association between the SSB resources.
Figure 9:
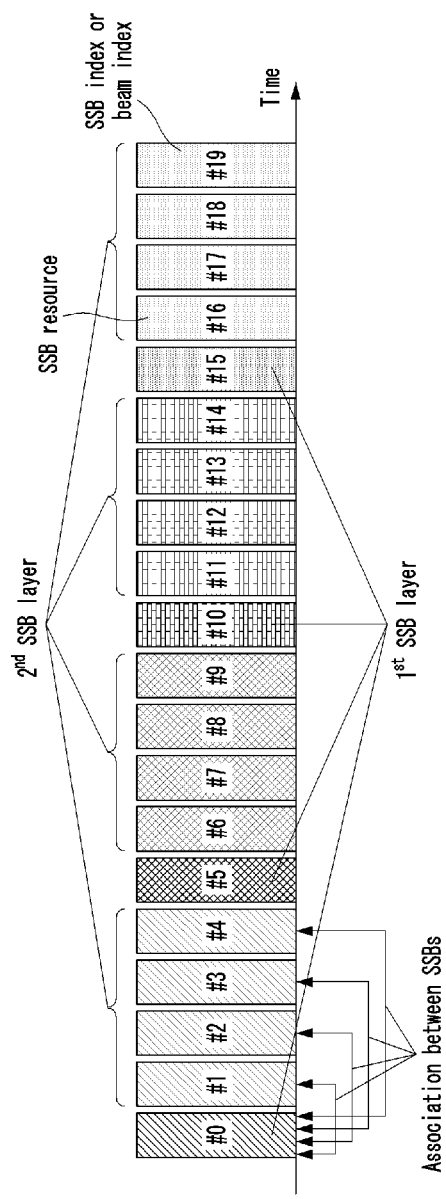
FIG. 9 is a conceptual diagram for describing a second exemplary embodiment of arrangement of SSB resources and association between the SSB resources.

FIG. 8 is a conceptual diagram for describing a first exemplary embodiment of arrangement of SSB resources and association between the SSB resources, and FIG. 9 is a conceptual diagram for describing a second exemplary embodiment of arrangement of SSB resources and association between the SSB resources.

Referring to FIGS. 8 and 9, a plurality of (e.g., 20) SSB resources may be arranged for beam sweeping-based SSB transmission. The SSB resources may be multiplexed in the time domain and may be mapped to the same frequency region. The SSB resources may have indices numbered chronologically. That is, an SSB resource mapped to earlier symbols within the same SSB transmission period may have a lower SSB index. Each SSB resource may belong to one of a plurality of SSB layers, that is, a first SSB layer and a second SSB layer.

Referring to FIG. 8, SSB resources belonging to the first SSB layer (or the second SSB layer) may be arranged first, and SSB resources belonging to the second SSB layer (or the first SSB layer) may be arranged later. For example, SSB resources corresponding to the lowest 4 ($=N_1$) indices may belong to the first SSB layer, and SSB resources corresponding to the highest 16 ($=N_2$) indices may belong to the second SSB layer. The terminal may determine an association relationship and QCL relationship between the SSB resources or the SSBs as described above. For example, the SSB resource #0 may be associated with the SSB resources #4 to #7, respectively. This may be true when $N_2 \geq N_1$. Based on the above-described rule and $N_1$ and $N_2$ values, the terminal may find out the association relationship between the SSBs and/or the configuration of the SSB layers.

Referring to FIG. 9, SSB resources belonging to the first SSB layer and SSB resources belonging to the second SSB layer may be arranged in an interlaced manner. For example, the SSB resource #0, which is the first SSB resource, may belong to the first SSB layer, and the SSB resources #1 to #4, which are the next four ($=N_2/N_1$) SSB resources, may belong to the second SSB layer. The SSB resource #0, which is the first SSB resource, may be associated with the SSB resources #1 to #4, which are the next four ($=N_2/N_1$) SSB resources, respectively. The same rule may be repeatedly applied to the remaining SSB resources. That is, the SSB resource #5, which is the next one SSB resource, may belong to the first SSB layer, and the SSB resources #6 to #9, which are the next four ($=N_2/N_1$) SSB resources, may belong to the second SSB layer. The SSB resource #5, which is the one SSB resource, may be associated with the SSB resources #6 to #9, which are the next four ($=N_2/N_1$) SSB resources, respectively. Based on the above-described rule and $N_1$ and $N_2$ values, the terminal may find out the association relationship between the SSBs and/or the configuration of the SSB layers.

In the above exemplary embodiments, the SSB resources may be resources in which the SSB is actually transmitted. Alternatively, some of the SSB resources may be resources in which the SSB is not actually transmitted. The base station may inform the terminal of SSB resources in which the SSB is actually transmitted (or SSB resources in which the SSB is not actually transmitted) through a signaling procedure. Based on the signaling from the base station, the terminal may receive a PDSCH by performing rate matching on each SSB resource in which the SSB is actually transmitted, and may receive a PDSCH in a resource region including each SSB resource in which the SSB is not actually transmitted (i.e., the PDSCH may not be rate-matched on the SSB resource).

SSB resources belonging to a plurality of SSB layers may be mapped within a predetermined time period. For example, the SSB resources may be mapped within a half-radio frame (e.g., 5 ms). For another example, the SSB resources may be mapped within an SSB transmission window. The SSB mapping or transmission/reception operations based on the SSB transmission window may be used in a specific frequency band (e.g., unlicensed band). A time gap or time interval may exist between the SSB resources, and the time gap may consist of one or more symbol(s). The time gap may be used for a beam switching operation between SSBs.

A random access and beam reporting method by the above-described association between downlink resource(s) and uplink resource(s) may also be applied to the above exemplary embodiments. For example, an association relationship between SSB resources (or SSBs) and PRACH resources (or PRACHs, PRACH occasions) may be configured to the terminal. In this case, the association between the SSBs and the PRACHs may be independent of the association between the SSB layers or the SSBs. In the above exemplary embodiment, each of the 20 SSB resources may be associated with one or more PRACH resources regardless of which SSB layer it belongs to. For example, the 20 SSB resources may correspond to 20 PRACH resources in an one-to-one manner. Alternatively, the association between the SSBs and the PRACHs may be determined by which SSB layer the SSB belongs to, or the association relationship between the SSBs. For example, the associated SSBs (e.g., an SSB belonging to the first SSB layer and an SSB belonging to the second SSB layer) may be associated with the same PRACH resource(s) (or the same PRACH occasion(s)).

[Initial Beam Determination and Reporting]

As described above, in a system in which a plurality of fine beams are used, when both an SSB belonging to the first SSB layer (e.g., SSB having a wide beamwidth) and an SSB belonging to the second SSB layer (e.g., SSB having a narrow beamwidth), which are received by a terminal (e.g., cell center terminal), satisfy a beam quality condition, it may be advantageous that the terminal selects the SSB (e.g., SSB having a wide beamwidth) belonging to the first SSB layer, and performs a random access procedure, initial beam determination, beam management operations, and/or the like based on the selected SSB. However, if the terminal simply selects the SSB having the largest received signal strength (e.g., RSRP, L1-RSRP, or the like) as the best SSB, a probability that the terminal selects the SSB belonging to the first SSB layer may be low. In order to solve the above problem, the conventional random access operation may need to be improved. Hereinafter, proposed methods will be described below.

First, the terminal may determine SSB(s) that satisfy a predetermined condition as valid SSB(s). In addition, the terminal may determine SSB(s) that do not satisfy the predetermined condition as invalid SSB(s). The terminal may measure received signal strengths of the SSBs (or, in general, initial access signals) and compare the measured signal strengths with a threshold value (or reference value). SSB(s) having a received signal strength that satisfies the threshold value (e.g., greater than or equal to the threshold value) may be considered as valid SSB(s), and beam(s) corresponding to the valid SSB(s) may be considered as valid beam(s). Conversely, SSB(s) having a received signal strength that does not satisfy the threshold value (e.g., less than the threshold value) may be considered as invalid SSB(s), and beam(s) corresponding to the invalid SSB(s) may be considered as invalid beam(s). For this, the threshold value may be defined. The threshold value may be pre-defined in a technical specification or configured by the base station to the terminal. The terminal may select or determine at least one SSB from among the valid SSBs, and may report the determined SSB(s) to the base station or perform a random access procedure based thereon. When no valid SSB(s) exist, the terminal may determine one SSB from among the invalid SSBs. The one SSB may be an SSB having the largest received signal strength. In the present disclosure, determining or reporting the SSB(s) by the terminal means that the terminal determines or reports SSB resource(s) corresponding to the SSB(s) or beam(s) corresponding to the SSB(s).

The terminal may determine one SSB from among the valid SSBs. When the terminal determines valid SSBs from a plurality of SSB layers (e.g., the first SSB layer and the second SSB layer), the terminal may first determine one (e.g., the first SSB layer) of the plurality of SSB layers, and determine one SSB from among valid SSBs belonging to the determined SSB layer (e.g., the first SSB layer). For the determination of the SSB layer, a priority between the SSB layers may be defined or configured in the terminal. For example, the terminal may obtain configuration information for determining the priority between the SSB layers through a signaling procedure from the base station. Additionally or alternatively, the priority between the SSB layers may be determined based on other information on the SSB layers. For example, the priority between the SSB layers may be determined based on the number of SSBs included in each of the SSB layers (i.e., the number of SSBs belonging to the first layer and/or the number of SSBs belonging to the second layer), SSB beamwidth thereof, SSB resource locations thereof, or a combination of the above factors. According to an exemplary embodiment, an SSB layer having a smaller number of SSBs may be considered to have a higher priority than an SSB layer having a larger number of SSBs. Alternatively, an SSB layer having a larger number of SSBs may be considered to have a higher priority than an SSB layer having a smaller number of SSBs. In addition, an SSB layer having a smaller number of SSBs may correspond to a relatively wider beamwidth than an SSB layer having a larger number of SSBs.

The terminal may determine an SSB layer having a higher (or the highest) priority among SSB layers in which the valid SSB(s) exist. A criterion for determining one SSB from among the valid SSBs in the determined SSB layer may be a measurement value of a received signal strength. Alternatively, the criterion may not be defined in a technical specification. As described above, when there is no valid SSB, the terminal may determine one SSB from among the invalid SSBs.

The determined one SSB (or, a beam corresponding thereto) may be reported to the base station. For example, based on the association relationship between SSB resources and PRACH resources described with reference to FIG. 3, the terminal may identify PRACH resource(s) associated with the determined SSB, and may transmit a PRACH in the identified PRACH resource(s). The base station may identify which SSB (or corresponding beam) the terminal determined or selected by successfully receiving the PRACH in the PRACH resource(s). The method described above may be referred to as (Method 200).

Figure 10:
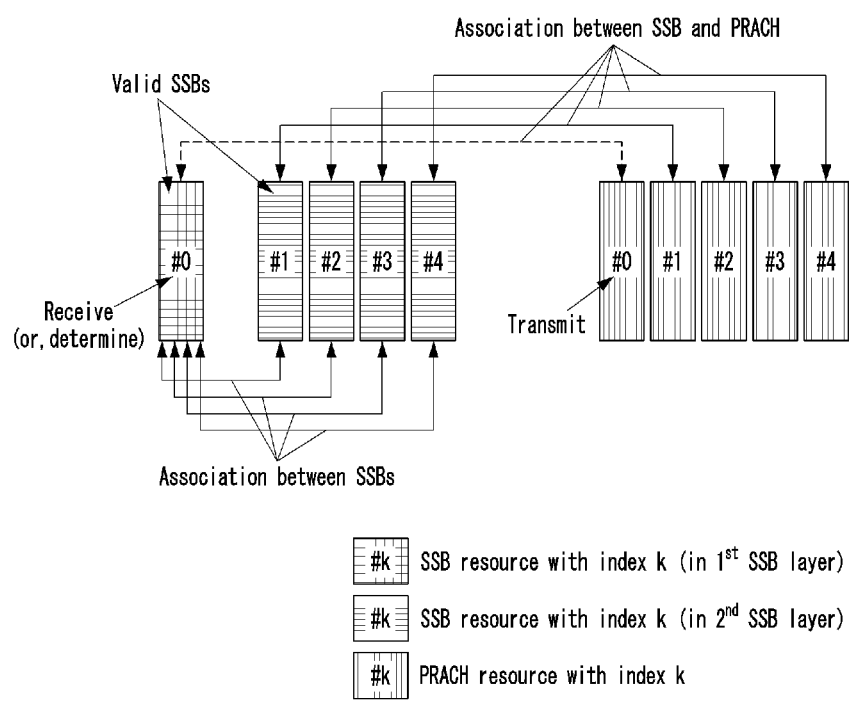
FIG. 10 is a conceptual diagram for describing a first exemplary embodiment of an initial beam determination and reporting method by (Method 200).

FIG. 10 is a conceptual diagram for describing a first exemplary embodiment of an initial beam determination and reporting method by (Method 200).

Referring to FIG. 10, five SSB resources may be classified into two SSB layers. An SSB resource #0 (or SSB #0) may belong to a first SSB layer, and SSB resources #1 to #4 (or SSBs #1 to #4) may belong to a second SSB layer. The SSB resource #0 may be associated with the SSB resources #1 to #4, respectively. In addition, the five SSB resources may be associated with five PRACH resources, respectively.

The terminal may determine the SSB resource #0 belonging to the first SSB layer and the SSB resource #1 belonging to the second SSB layer as valid SSBs. In this case, the terminal may determine one SSB by (Method 200). For example, the first SSB layer may have a higher priority than the second SSB layer, and the terminal may determine the SSB resource #0 belonging to the first SSB layer as the best SSB. In addition, the terminal may determine a beam corresponding to the SSB resource #0 as a serving beam. The terminal may transmit a PRACH in a PRACH resource #0 associated with the SSB resource #0, and the base station may identify that the terminal selects the SSB resource #0 by receiving the PRACH.

According to (Method 200), the terminal may preferentially select an SSB belonging to a specific SSB layer (e.g., the first SSB layer) or having a specific beamwidth (e.g., wide beamwidth) and use a beam corresponding to the selected SSB as a serving beam. Accordingly, the problem of frequent changes of the serving beam described above with reference to FIG. 2 may be solved. However, use of an SSB (or a corresponding beam) belonging to other SSB layer (e.g., the second SSB layer) or having a different beamwidth (e.g., narrow beamwidth) may be useful for a cell center terminal. For example, when transmitting a data channel, a data throughput may be more important than reliability, and beamforming using a fine beam rather than a wide beam may be advantageous. Accordingly, a method of using a beam having a wide beamwidth for transmission of a control channel and using a beam having a narrow beamwidth for transmission of a data channel may be considered. However, according to (Method 200), the terminal may not determine or report an SSB (or a corresponding beam) belonging to other SSB layer (e.g., the second SSB layer) or having a different beamwidth (e.g., narrow beamwidth), and the SSB (or a corresponding beam) may be difficult to be utilized for transmissions in a subsequent procedure.

Alternatively, the terminal may determine one or a plurality of SSB(s) from among the valid SSBs. According to a first exemplary embodiment, the terminal may determine at most one SSB for each of K SSB layers, and may determine totally at most L SSBs (K and L are natural numbers). For example, L=K. If two SSB layers are used, L=K=2. According to the first exemplary embodiment, the terminal may select at most one SSB having a wide beamwidth from the first SSB layer and may select at most one SSB having a narrow beamwidth from the second SSB layer. According to a second exemplary embodiment, the terminal may determine at most L SSBs from among valid SSBs belonging to the K SSB layers. For example, L=K. If two SSB layers are used, L=K=2. According to the second exemplary embodiment, more various combinations of SSBs may be determined. For example, the terminal may select at most two SSB(s) having a wide beamwidth from the first SSB layer. Alternatively, the terminal may select at most two SSB(s) having a narrow beamwidth from the second SSB layer. Similarly, when there are no valid SSBs, the terminal may determine one SSB or a plurality of SSBs (e.g., at most L SSBs) from among the invalid SSBs.

The determined one or more SSB(s) (or corresponding beam(s)) may be reported to the base station. When the terminal determines one SSB, the terminal may report the SSB to the base station in an implicit manner by transmitting a PRACH in a PRACH resource associated with the one SSB. Meanwhile, when the terminal determines a plurality of SSBs, the terminal may transmit PRACHs in a plurality of PRACH resources associated with the plurality of SSBs. If the plurality of SSBs are associated with the same PRACH resource, the terminal may transmit a PRACH in the PRACH resource. For example, by the above-described method, the terminal may determine two SSBs associated with each other as initial SSBs. The determined SSBs may belong to different SSB layers. The terminal may transmit PRACHs in two PRACH resources associated with the two SSBs, respectively. In this case, the terminal may repeatedly transmit the same PRACH (e.g., the same preamble, the same sequence) in the two PRACH resources. The two PRACH resources may be resources belonging to the same PRACH resource period, and the repeated PRACH transmissions may be performed within the same PRACH resource period. A transmission beam applied by the terminal to each PRACH resource may be formed based on a reception beam of the SSB resource associated with the PRACH resource. According to the association between the SSBs, the PRACH resources may also have an association relationship. That is, the PRACHs respectively associated with the associated SSBs may be associated with each other. The method described above may be referred to as (Method 210).

Figure 11:
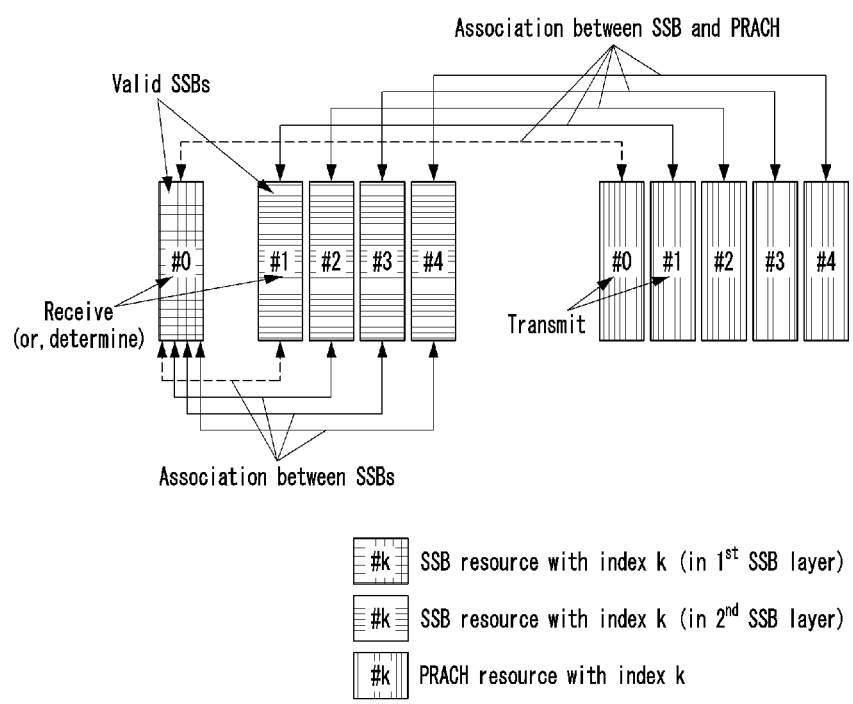
FIG. 11 is a conceptual diagram for describing a first exemplary embodiment of an initial beam determination and reporting method by (Method 210).

FIG. 11 is a conceptual diagram for describing a first exemplary embodiment of an initial beam determination and reporting method by (Method 210).

Referring to FIG. 11, five SSB resources may be classified into two SSB layers. An SSB resource #0 (or SSB #0) may belong to a first SSB layer, and SSB resources #1 to #4 (or SSBs #1 to #4) may belong to a second SSB layer. The SSB resource #0 may be associated with the SSB resources #1 to #4, respectively. In addition, the five SSB resources may be associated with five PRACH resources, respectively.

The terminal may determine the SSB resource #0 belonging to the first SSB layer and the SSB resource #1 belonging to the second SSB layer as valid SSBs. In this case, the terminal may determine a plurality of SSBs by (Method 210). For example, the terminal may determine the SSB resource #0 in the first SSB layer and may determine the SSB resource #1 in the second SSB layer. Also, the terminal may determine beams corresponding to the SSB resource #0 and the SSB resource #1 as serving beams. The terminal may transmit PRACHs in PRACH resources associated with the SSB resource #0 and the SSB resource #1, that is, a PRACH resource #0 and a PRACH resource #1, and the base station may identify that the terminal selects the SSB resource #0 and the SSB resource #1 by receiving the PRACHs.

That is, the terminal may perform an initial access procedure to the base station using the beam corresponding to the SSB resource #0 (hereinafter, a first initial beam) and the beam corresponding to the SSB resource #1 (hereinafter, a second initial beam). Alternatively, the terminal may perform an initial access procedure to the base station by using at least one of the beam corresponding to the SSB resource #0 (i.e., the first initial beam) and the beam corresponding to the SSB resource #1 (i.e., the second initial beam). Here, at least one beam used for the initial access procedure among the first initial beam and the second initial beam may be determined based on a rule predefined in a technical specification or configuration information received from the base station.

Meanwhile, the use of the initial beams may be defined. For example, one beam (hereinafter, referred to as a 'primary beam') among the plurality of initial beams determined by the terminal may be used for transmission/reception of control channels (e.g., PDCCH or PUCCH), and another beam (hereinafter referred to as a 'secondary beam') may be used for transmission/reception of data channels (e.g., PDSCH or PUSCH). The control channel and data channel may be channels transmitted while performing a random access procedure. For example, the PDSCH may be a PDSCH including a Msg2 (i.e., Msg2 PDSCH) or a PDSCH including a random access response message, and the PDCCH may be a PDCCH scheduling the Msg2 PDSCH (e.g., a PDCCH whose CRC is scrambled with an RA-RNTI). In addition, the PUSCH may be a PUSCH including a Msg3, and the PUCCH may be a PUCCH including a HARQ-ACK for the Msg2 PDSCH or a Msg4 PDSCH. The use of the above-described initial beams may be predefined in a technical specification. For example, the primary beam may correspond to a beam having a wide beamwidth, and the secondary beam may correspond to a beam having a narrow beamwidth.

When the base station successfully receives PRACHs in the plurality of PRACH resources, the base station may identify the plurality of SSBs determined by the terminal or beams corresponding thereto. For example, the base station may receive the PRACHs in the first PRACH resource and the second PRACH resource, thereby identifying the first SSB and the second SSB determined by the terminal, respectively. The base station may determine for what purpose the first initial beam corresponding to the first SSB and the second initial beam corresponding to the second SSB are to be used, and may perform transmission with the terminal accordingly. For example, the first initial beam may be a beam having a wide beamwidth and the second initial beam may be a beam having a narrow beamwidth. In this case, the base station may determine the first initial beam as the primary beam and determine the second initial beam as the secondary beam.

Alternatively, the use of the first initial beam and the second initial beam may be determined by the terminal. For example, the terminal may determine one of the first initial beam and the second initial beam corresponding to the plurality of SSBs determined by the terminal as the primary beam, and determine the other as the secondary beam. The terminal may report information on which beam is determined as the primary beam to the base station. For example, the information may be reported based on a plurality of PRACH sequences. When determining the first initial beam as the primary beam, the terminal may transmit a first PRACH sequence to the base station, and when determining the second initial beam as the primary beam, the terminal may transmit a second PRACH sequence to the base station. For example, the first PRACH sequence may be transmitted in the first PRACH resource corresponding to the first initial beam, and the second PRACH sequence may be transmitted in the second PRACH resource corresponding to the second initial beam. For another example, one of the first PRACH sequence and the second PRACH sequence may be transmitted in the same PRACH resource. As another example, the information may be transmitted to the base station as being included in a payload of a MsgA PUSCH. Alternatively, the information may be reported to the base station after the terminal receives the Msg2 or MsgB. For example, the information may be reported to the base station as an RRC message or MAC CE.

When (Method 210) is used, the terminal may transmit PRACHs in a plurality of PRACH resources. In this case, when the plurality of PRACH resources are mapped to the same symbol(s), the terminal may transmit a PRACH in one of the plurality of PRACH resources. The one of the PRACH resources may be arbitrarily determined by the terminal.

Alternatively, the one of the PRACH resources may be a resource corresponding to a specific SSB, a specific SSB layer, or a specific beam. For example, the one PRACH resource may be a PRACH resource associated with an SSB belonging to the first SSB layer. For another example, the one PRACH resource may be a PRACH resource associated with an SSB corresponding to the primary beam. Alternatively, when the plurality of PRACH resources are mapped to the same symbol(s), the terminal may transmit PRACHs in all of the plurality of PRACH resources. As another method, the terminal may not expect the plurality of PRACH resources to be mapped to the same symbol(s). The base station may eliminate a case in which the terminal selects PRACH resources arranged in the same symbol(s) by appropriately disposing the SSB resources and the PRACH resources.

When (Method 210) is used, the terminal may determine a plurality of SSBs, and a CORESET may correspond to each of the plurality of SSBs. For example, a first CORESET and a second CORESET may correspond to a first SSB and a second SSB, respectively. The first CORESET and the second CORESET may be CORESET #0 disposed in different resources. That is, the first CORESET and the second CORESET may have the same CORESET ID. The terminal may monitor both the first CORESET and the second CORESET. Alternatively, the terminal may monitor one CORESET from among the plurality of CORESETs. For example, the one of the CORESETs may be arbitrarily determined by the terminal. For another example, the one CORESET may be a CORESET corresponding to a specific SSB, a specific SSB layer, or a specific beam. For example, the one CORESET may be a CORESET indicated by an SSB belonging to the first SSB layer (or a PBCH or MIB included in the SSB). For another example, the one CORESET may be a CORESET indicated by an SSB corresponding to the primary beam. According to the above-described QCL relationship, a QCL relationship may be established between the first CORESET and the second CORESET. The terminal may monitor all of (or simultaneously) PDCCH candidates belonging to the first CORESET and PDCCH candidates belonging to the second CORESET in the same symbol(s), and may receive all of (or simultaneously) PDCCHs transmitted from the PDCCH candidates. In the above exemplary embodiments, the terminal may perform operations such as initial access, random access, transmission/reception of control and data channels, beam management, CSI acquisition and reporting, and/or the like using only some of the plurality of SSB layers. For example, the terminal may select one or a plurality of SSB layer(s) based on information on its location within the serving cell, and perform an initial access operation or a random access operation based on the selected SSB layer(s). For example, a cell edge terminal may selectively use only an SSB layer corresponding to a narrow beamwidth, and a cell center terminal may use both an SSB layer corresponding to a wide beamwidth and an SSB layer corresponding to a narrow beamwidth for the above-described operations.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method performed by a terminal, comprising:
receiving, from a base station, at least one synchronization signal block (SSB) belonging to a first layer;
receiving, from the base station, at least one SSB belonging to a second layer;
determining valid SSB(s) from among the at least one SSB belonging to the first layer and the at least one SSB belonging to the second layer;
selecting at least one first SSB belonging to a layer having a higher priority among the first layer and the second layer from among the valid SSB(s); and
reporting the selected first SSB to the base station, and using a beam used for receiving the first SSB to perform an initial access procedure for communications with the base station,
wherein each SSB includes at least one of a synchronization signal or a broadcast channel.

2. The method according to claim 1, wherein the valid SSB(s) are SSB(s) received at the terminal with a received signal strength greater than or equal to a predetermined threshold.

3. The method according to claim 1, wherein a priority between the first layer and the second layer is determined by configuration information received from the base station.

4. The method according to claim 1, wherein a priority between the first layer and the second layer is determined based on a number of SSB(s) belonging to the first layer and/or a number of SSB(s) belonging to the second layer.

5. The method according to claim 1, wherein the first SSB is an SSB having a largest received signal strength among the valid SSBs.

6. The method according to claim 1, wherein the terminal reports the selected first SSB to the base station by transmitting a random access preamble to the base station in uplink resource(s) associated with the selected first SSB.

7. The method according to claim 1, wherein the performing of the initial access procedure comprises at least one of an operation of receiving a downlink signal for initial access based on the beam or an operation of transmitting an uplink signal for initial access based on the beam.

8. A method performed by a terminal, comprising:
receiving, from a base station, at least one synchronization signal block (SSB) belonging to a first layer;
receiving, from the base station, at least one SSB belonging to a second layer;
determining valid SSB(s) from among the at least one SSB belonging to the first layer and the at least one SSB belonging to the second layer;
selecting a first SSB belonging to the first layer and a second SSB belonging to the second layer from among the valid SSB(s); and reporting the selected first SSB and the selected second SSB to the base station, and using at least one beam among a first beam used for receiving the first SSB and a second beam used for receiving the second SSB to perform an initial access procedure for communications with the base station, wherein each SSB includes at least one of a synchronization signal or a broadcast channel.

9. The method according to claim 8, wherein the valid SSB(s) are SSB(s) received at the terminal with a received signal strength greater than or equal to a predetermined threshold.

10. The method according to claim 8, wherein the first SSB is an SSB having a largest received signal strength among valid SSB(s) belonging to the first layer, and the second SSB is an SSB having a largest received signal strength among valid SSB(s) belonging to the second layer.

11. The method according to claim 8, wherein the terminal reports the selected first SSB to the base station by transmitting a random access preamble to the base station in uplink resource(s) associated with the selected first SSB, and reports the selected second SSB to the base station by transmitting a random access preamble to the base station in uplink resource(s) associated with the selected second SSB.

12. The method according to claim 10, wherein the at least one beam used to perform the initial access procedure among the first beam and the second beam is determined based on a rule predefined in a technical specification or configuration information received from the base station.

13. The method according to claim 12, wherein one of the first beam and the second beam is selected as a primary beam used for control channel transmission to the base station, the other beam is selected as a secondary beam used for data channel transmission to the base station, and a beamwidth of the primary beam is wider than a beamwidth of the secondary beam.

14. A method performed by a base station, comprising:
transmitting at least one synchronization signal block (SSB) belonging to a first layer;
transmitting at least one SSB belonging to a second layer; and
receiving a report of a first SSB selected by the terminal from the terminal, and using a beam used for transmitting the first SSB to perform an initial access procedure for communications with the terminal, wherein the first SSB is one of valid SSB(s) determined by the terminal from among the at least one SSB belonging to the first layer and the at least one SSB belonging to the second layer and belongs to a layer having a higher priority among the first layer and the second layer, and each SSB includes at least one of a synchronization signal or a broadcast channel.

15. The method according to claim 14, wherein the valid SSB(s) are SSB(s) received at the terminal with a received signal strength greater than or equal to a predetermined threshold.

16. The method according to claim 14, further comprising transmitting, to the terminal, configuration information for determining a priority between the first layer and the second layer.

17. The method according to claim 14, wherein a priority between the first layer and the second layer is determined based on a number of SSBs belonging to the first layer and/or a number of SSBs belonging to the second layer.

18. The method according to claim 14, wherein the first SSB is an SSB having a largest received signal strength among the valid SSB(s).

19. The method according to claim 14, wherein a report of the selected first SSB is received from the terminal by receiving a random access preamble from the terminal in uplink resource(s) associated with the selected first SSB.

20. The method according to claim 14, wherein SSBs belonging to the first layer are disposed before SSBs belonging to the second layer within an SSB transmission period, or the SSBs belonging to the first layer and the SSBs belonging to the second layer are disposed in an interlaced manner within the SSB transmission period.

* * * * *